Figure 2:
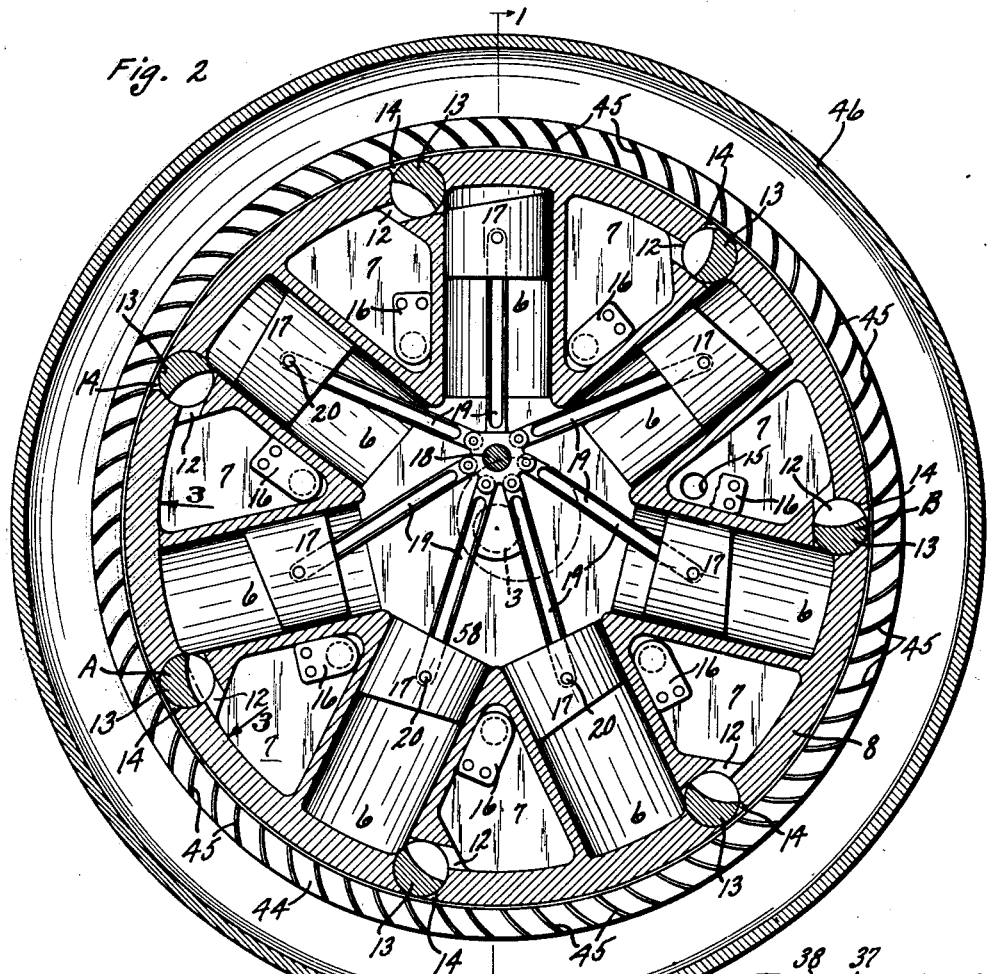

June 27, 1933.   F. R. HIGLEY   1,915,995
MOTOR
Filed Feb. 11, 1931   2 Sheets-Sheet 1
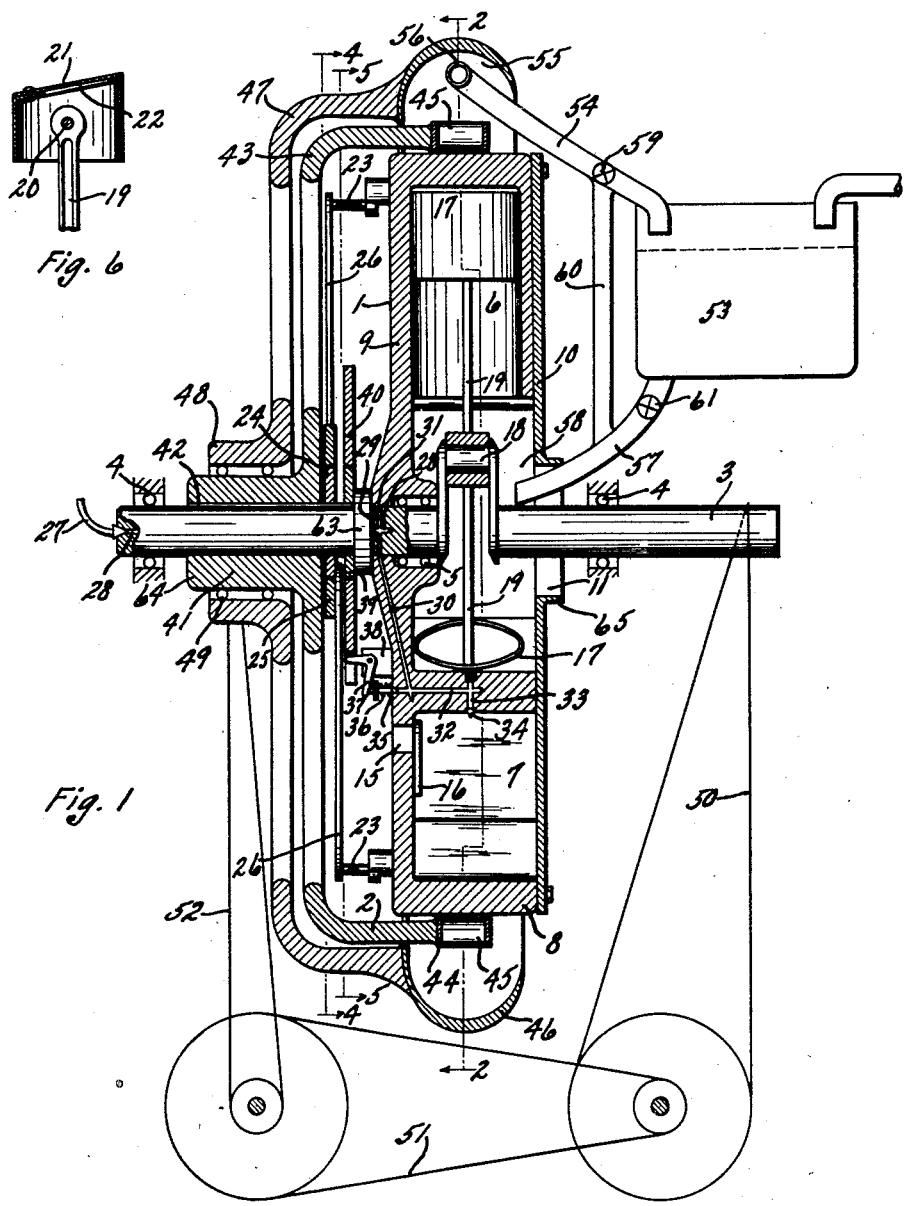
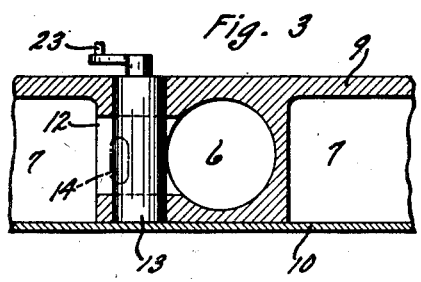
INVENTOR
Frank R. Higley
Brockett, Hyde, Higley & Meyer
ATTORNEYS June 27, 1933.  F. R. HIGLEY  1,915,995
MOTOR
Filed Feb. 11, 1931  2 Sheets-Sheet 2

INVENTOR
Frank R. Higley
BY Brockett, Hyde, Higley & Meyer
ATTORNEYS

Patented June 27, 1933

1,915,995

UNITED STATES PATENT OFFICE

FRANK R. HIGLEY, OF CLEVELAND HEIGHTS, OHIO

MOTOR

Application filed February 11, 1931. Serial No. 514,943.

This invention relates to prime movers wherein pressure is generated in a rotor through an internal combustion cycle including compression by liquid displacement, and wherein the pressure so generated is converted into useful power through the medium of this same liquid employed as in a turbine. Such an "internal combustion turbo-motor" in an elementary form is illustrated and described in my copending application, Serial No. 505,456, filed December 29, 1930, and the present invention comprises generally improvements thereupon.

The motor of said copending application while operable is somewhat impracticable in its manner of operation on its turbo side, that is, in its manner of employing the liquid medium under the pressures generated by compression. The present application embraces a more efficient means for such conversion of hydraulic into mechanical energy; and such is an object of this invention. Briefly, this feature of the invention comprises the provision, in addition to the rotor, of a runner having blades or vanes upon which the liquid ejected from the rotor may act, to impart rotational forces to the runner, employing principles comparable with those upon which the well-known Fourneyron type of turbine is based.

By this arrangement the runner, with which the load is connected, may operate at a different speed than that of the rotor which drives the runner. The speeds of the two parts may be positively maintained in fixed relation, as by gearing; but it is also possible to arrange that the rotor be self-maintained in operation by rotational forces imparted thereto during discharge therefrom.

Where the rotor speed is to be the greater, the cycle of operations in the rotor may be timed according to the difference in the two speeds—in other words, according to the lag of the runner behind the rotor. Obviously when this is done, and the runner is slowed down by an increase in load, the cycle of operations in the rotor will automatically be speeded up. This will increase the rotor output and give the runner the added capacity necessary to take care of the increased load. As soon, however, as the runner recovers its speed, the cycle of rotor operations will be slowed down. The motor will thus have inherent self-governing characteristics.

All of these things are further objects of the invention.

The rotor may thus operate at very high speeds, yet the runner operate at lower and more useful speeds. And since the rotor speed is unlimited it becomes possible to incorporate within the rotor itself, centrifugal means for providing the liquid pressures for compression of the charge. This is another and important object of the invention.

Where the coupling between rotor and runner is only a hydraulic one as described, the coupling will have characteristics of a variable speed hydraulic transmission. Starting torque need be applied only to the rotor, and in some cases the load may be continuously connected with the runner.

These also are notable objects of the invention.

Other objects are to provide improved pump means incorporated in the rotor itself, for providing the liquid for compression; and to arrange the pump means in a unique manner with respect to the combustion chamber pockets of the rotor; also, to provide improved means for collecting liquid outflowing from the runner, and for recirculating this liquid in the apparatus.

Figure 4:
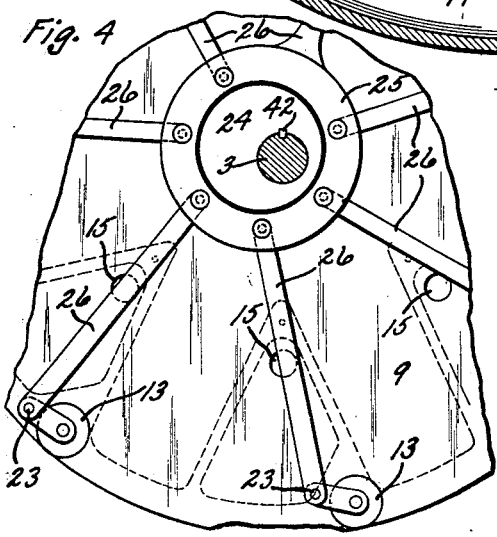
Figure 5:
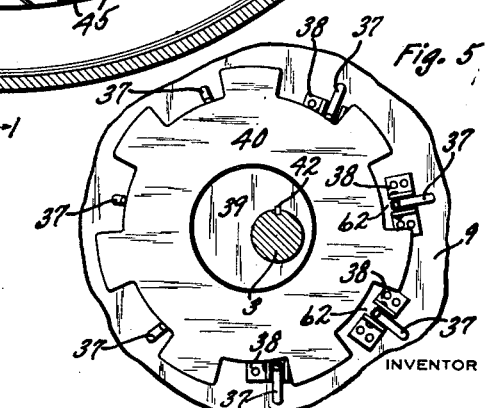

The exact nature of the invention together with further objects and advantages thereof will be apparent from the following description taken in connection with the accompanying drawings which will be recognized as more or less elementary and conventionalized showings illustrative of the principles of the invention, rather than attempts to show the structure of actual commercial units. Figs. 1 and 2 are longitudinal and transverse sections respectively of a selected embodiment of the invention, the section of Fig. 1 being indicated by the line 1—1, Fig. 2, and the section of Fig. 2 being indicated by the line 2—2, Fig. 1; Fig. 3 is a detail of the combustion chamber unit taken as in the developed plane of line 3—3, Fig. 2; Fig. 4 is a detail end elevation of the valve gear employed, taken as in the transverse plane of line 4—4, Fig. 1; Fig. 5 is a similar showing of the injection valve gear, in the plane of line 5—5, Fig. 1; Fig. 6 is a detail section of a portion of one of the pistons showing the valve carried thereby.

With reference now to the drawings, the two principal parts of the motor are a rotor 1 and a runner 2. The runner is rigidly secured upon a shaft 3 carried in suitable bearings as indicated at 4; and the rotor is likewise mounted on the shaft 3 but for free rotation thereon as indicated by the bearing at 5.

The rotor is provided with a number of cylinders 6, seven being indicated, evenly disposed about the shaft 3 in a plane transverse thereof, each cylinder extending radially of the shaft. Between each adjacent pair of cylinders there is a hollow or pocket 7 closed at its outer extremity by the peripheral wall 8 which extends entirely about the rotor and thus serves also to close the outer ends of the cylinders 6. The rotor has a pair of side walls 9 and 10 which complete the sides of the pockets 7 and cylinders 6, the side wall 9 continuing inwardly to the shaft 3 to provide the bearing 5, but the opposite wall 10 having a central opening 11 providing a considerable annular clearance above the shaft.

Between each cylinder 6 and one of its adjacent pockets 7 is a passage opening 12 controlled by valve means here shown as a cylindrical valve 13. For each valve 13 there is also a discharge opening 14 leading outwardly through the peripheral wall 8 of the rotor; and the arrangement of the valve means is such that it is movable as by oscillation upon its axis in the example illustrated, between one position as at A, Fig. 2, to connect its cylinder with its pocket, and a second position as at B, Fig. 2, to close said first connection and instead connect its pocket with the corresponding outlet opening 14.

In one or both of the side walls 9, 10, adjacent the inner extremity of each pocket 7, is an inlet port opening 15 closed by an automatic spring flap valve 16 seating thereover to prevent egress from the pocket but yieldable to allow inlet thereto.

A piston 17 is provided for each cylinder 6 to form therewith a pump unit. A crank 18 is provided on the shaft 3 in the common central plane of the cylinders, and all of the pistons 17 have connection with said crank to be actuated thereby, each through a connecting rod 19 and wrist pin 20 as is usual in such a radial arrangement. Thus, when there is relative motion of the rotor and crank, each piston 17 will be reciprocated in its cylinder 6, and the timing of the pistons will be evenly distributed. As conventionally indicated Fig. 6, each pump piston 17 is provided with automatic valve means such as a spring flap valve 21 controlling a port 22 whereby flow may be had through the port 22 past the piston in a direction outward of the shaft 3 but return flow inwardly will be prevented.

Means for controlling the valves 13 each in timed relation with its piston 17 are provided and here indicated as including a crank 23 for each valve 13, an eccentric 24 secured upon the shaft 3, a strap 25 riding the eccentric, and for each crank 23 a connecting rod 26 joining the strap therewith; whereby the valves will be caused to oscillate between their two described positions, in evenly timed relation. The timing of the eccentric 24, that is, its angular adjustment on the shaft 3 relative to the crank 18, is such that when the rotor moves right-hand, Fig. 2, upon the shaft 3, as each piston 17 moves outwardly in its cylinder 6, the corresponding valve 13 will close its opening 14 and connect the cylinder with the corresponding pocket 7 as at A, Fig. 2; whereas at other times in the cycle the valve 13 will close the cylinder and open the passage 14 from the pocket as at B, Fig. 2.

Means are provided for injecting fuel into the pockets 7. To this end a pipe line 27 leading from a source of fuel supply connects with one end of a central longitudinal bore 28 in the shaft 3 which communicates with a transverse bore 29. The wall 9 of the rotor fits closely upon the shaft in the plane of the bore 29 and contains a number of radially extending drills 30, one for each pocket 7 leading from an annular groove 31 with which the bore 29 connects. Each drill 30 leads to a drill 32 which connects with a radial drill 33 leading to a nozzle 34 opening into the corresponding pocket 7. Fuel is maintained in the described system by a slight pressure at the line 27.

To effect injection of a charge of this fuel into the pockets 7, pump means are provided, one for each pocket. Pump details are immaterial here but a simple plunger 35, fitted in the drill 32 to move past the mouth of the drill 30 and yieldably urged outwardly as by the spring 36, will serve for illustration.

Means are provided for actuating the plungers in timed relation with the valves 13 and the pistons. For the purpose of illustration, for each plunger 35, a bell crank 37 carried by brackets 38 mounted on the rotor wall 9, is arranged for movement in a plane in which the shaft 3 will lie. One arm of the bell crank bears against the end of the plunger as indicated, and the other arm extends parallel with the shaft 3. An eccentric 39 is secured upon the shaft 3 to carry a non-rotating rider 40. This rider has peripheral notches one for each bell crank 37 into which the parallel bell crank arms may extend. Obviously the arrangement illustrates one by which the several plungers 35 will be depressed in succession to cause fuel injection into their several pockets 7, upon relative rotation of the rotor and shaft. The timing of the eccentric 39 and the proportion and arrangement of the parts is such that for any pocket 7 injection of fuel thereinto will be had just at the end of the outward stroke of the corresponding piston 17. The shown lost motion between the rider and bell cranks indicates a short rapid plunger working stroke.

The principal parts of the runner 2 are a hub 41 fixed on the shaft 3 as indicated by the key 42, a spider 43 and the runner proper 44 supported by the spider to extend about the periphery of the rotor 1. The runner includes a number or vanes or blades 45 in the plane of the openings 14 of the rotor to be acted upon by the discharge therefrom. These blades are angularly disposed with reference to radial lines to cause rotation of the runner, and have curvature as conventionally indicated to provide proper entrance and exit angles dependent upon the relative velocities which are to exist under operating conditions, as will be appreciated by one familiar with the hydraulic turbine art.

About the runner 44 is a collector 46 to collect the discharge from the runner. The collector 46 is carried by a spider 47 having a hub 48 mounted for rotation concentric with the rotor as by bearings at 49 upon the hub 41 of the runner. That the collector 46 may retain by centrifugal force, liquids collected therein, provision is made to maintain the collector 46 in rotation during operation of the motor, but preferably at a lower speed than the other parts, as conventionally indicated by the belting and pulley arrangement shown in Fig. 1 and including the belt 50 driven by the shaft 3, the intermediate belt 51 and a belt 52 driving the hub 48, together with the step-down double pulleys indicated as connecting the belts.

That drainage from the collector 46 may be had I provide a receiver 53 with a pipe 54 extending therefrom upwardly into the annular trough 55 provided by the collector 46, the pipe having an open mouth 56 turned in the direction from which the collector advances. That there may be delivery from the receiver to the cylinders 6 of the rotor, I lead a pipe 57 from the receiver downwardly and through the opening 11 of the side wall 10 of the rotor.

The cycle of operations will be as follows, assuming the motor already operating, with, by way of example, the rotor moving 500 revolutions per minute right-hand, the runner moving 400 R. P. M. in the same direction, and the collector say 100 R. P. M. preferably also in the same direction. It will be apparent that the crank 18 will, with reference to the rotor, be moving 100 R. P. M. in left-hand direction, so that the pistons 17 will be reciprocated in their cylinders 6 but at relatively low speeds. Similarly the eccentrics 24 and 39 of the valve and injection gear will actuate such gear in timed relation with the pistons.

A non-combustible liquid medium such as water is being delivered by the pipe 57 to the central space 58 between the cylinders 6. Since the rotor is revolving at 500 R. P. M. centrifugal force is greater than gravity and causes this liquid to seek an annular level about the axis of the parts, entering the cylinders 6 and moving outwardly to fill the same. The inner level of the liquid is maintained at a radius say approximately that of the wall 10 of the rotor about the opening 11 so that the level is well above the mouths of the cylinders, so that the cylinders are maintained filled.

Considering now a valve 13 positioned as at B, Fig. 2, and the associated pump and pocket 7 which together form a unit, communication between the cylinder and pocket of the unit is cut off by the valve 13 and the piston is moving inwardly. Consequently the liquid from the space 58 is flowing through the port 22 in the piston past the valve 21 thereof.

The valve 13 has established a discharge passage from the pocket 7 through the openings 12 and 14. Since the rotor is revolving centrifugal force causes evacuation of the pocket 7 outwardly of the rotor and through the runner. The pressure within the pocket being thus below atmosphere, the valve or valves 16 of the pocket open and fresh outside air is induced into the pocket through the air inlet ports 15 of the pocket. The air may freely find its way to the port 15 in the rotor wall 9 between the legs of the spiders 47 and 43 of the collector and runner respectively.

Ultimately there is progression of those parts moving relative to the rotor until conditions indicated at A are attained wherein the piston is moving outwardly on its working stroke, assisted by the weight of liquid on its crank end. By this time the valve 13 has moved to provide communication from the cylinder 6 into the pocket 7 and to close the discharge opening 14. Thus the liquid trapped under the piston by closing of the valve 21 is forced into the pocket. the level rising radially inward thereof. Escape of the air previously induced into the pocket is prevented by closing of the inlet valve 16 so that air is trapped in that portion of the pocket nearest the axis of the parts.

The relative volumetric capacities of piston and pocket are such that sufficient compression of the air in the pocket is caused by the liquid displacement therein provided by the discharge from the pump, so that combustion will instantly follow proper injection of suitable liquid fuel into the trapped air.

As the piston completes its outward or working stroke, so that compression of the trapped air is at a maximum, injection is had; the injection gear being properly timed for the purpose. The immediate cause of the injection is, of course, actuation of the proper bell crank 37 to depress its plunger 35 beyond the mouth of its passage 30, build up sufficient pressure in the passages 32 and 33, unseat the injection valve from the nozzle 34, and overcome the compression pressure, whereupon injection is had through the nozzle.

As injection will continue only during a very short part of the cycle a lost motion is indicated at 62 so that the member 40 will clear each bell crank during the greater part of the time.

Injection is instantly followed by combustion accompanied by enormous increase in pressure as will be appreciated by one familiar with the internal combustion art, who will recognize the pocket 7 as providing the combustion chamber of the rotor. But meanwhile the valve 13 has closed communication with the cylinder 6 and reopened the passage from the pocket through the discharge opening 14. Therefore, the liquid which provided compression by displacement is now ejected at a high velocity from the pocket through the mouth 14 and against the opposite blades of the runner. It will be appreciated that in effect the mouth 14 represents the nozzle of a Fourneyron type of turbine, which is well known in the hydraulic turbine art, the only notable difference here being that the nozzle is moving in a circular path within the runner, instead of fixed. The absolute path of flow from the nozzle will of course lie between lines respectively tangent to and radial of the rotor and determining a quadrant forward thereof.

Although most of the force of the outflowing stream is utilized by the runner blades to actuate the runner, the disposition and configuration of the mouth 14 of the valve 13, or of both, is such that at the same time sufficient force is imparted to the rotor to maintain it in operation. In other words, the path of departure relative to the rotor lies between lines respectively tangent thereto and radial thereof and in the rearward quadrant.

Also, by the design of the runner blades sufficient velocity is allowed to remain in the liquid that it will leave the runner blades and enter the trough 45 of the collector.

Immediately the liquid leaves the pocket 7 it is followed by the products of combustion and thereafter by fresh air entering by way of the air inlet opening 15 as described. The products of combustion, after leaving the pocket, will be dissipated, but the liquid will remain in the trough, owing to the collector velocity, until picked up by the mouth 56 of the pipe 54 and returned to the receiver 53.

During operation the rotor will be cooled by the liquid passing therethrough. Each combustion chamber pocket is effectively jacketed on its converging sides by the liquid in the adjacent pump cylinders. The runner blades, which are subjected to the heat of the products of combustion, are likewise cooled by the liquid following the same.

A valve indicated at 59 may divert a controlled amount of the liquid past the receiver by way of the bypass pipe 60. Also, a valve 61 may be located at the receiver outlet, which when closed will cause collection of the liquid from the system into the receiver whereupon the motor will cease to function, the capacity of the receiver being sufficient for the purpose.

It will be apparent that when the motor is running, the rate of discharge and evacuating effect upon products of combustion will increase with the rotor speed. The load is connected with the shaft 3, and hence with the runner so that the runner speed will vary with the load. Thus, there may be a variable difference between the load speed and that of the rotor, and the valve gear is obviously timed according to this difference. The result is that as increased load increases the lag of the runner, the speed of the succession of operations in the rotor will be correspondingly increased so that the rotor will increase its rate of discharge and may move faster. This in turn will increase the power upon the runner and consequently upon the load, and will tend to satisfy the increased demand thereof. It follows that as the load is picked up, the runner speed increasing to more nearly approach that of the rotor, the speed of succession of operations in the rotor is correspondingly decreased. In other words, the runner always tends to attain the speed of the rotor but never accomplishes this, as upon such accomplishment movement of the crank 18 and the valve gear relative to that of the rotor would become zero. Thus, for any given setting of the injection gear to provide any selected injection charge, the motor will, with self-governing effect, automatically take care of a varying load, increasing the torque thereupon as the speed of the shaft 3 is diminished, and decreasing the torque as the shaft 3 increases in speed.

In starting the motor, assuming the arrangement of the parts as in the drawings, all of the liquid being in the reservoir 53, the rotor is put into operation by starting means of any form and the valve 61 opened to allow delivery of liquid into the rotor. The load may be conceivably on the shaft 3 or at least such load thereon that the shaft will not follow rotation of the rotor. The crank 18 and valve gear have motion relative to the rotor so that the cycle of operations commences in the rotor as soon as sufficient liquid is delivered to provide enough compression in one of the pockets 7 to cause combustion therein of the injected fuel. Thereupon the rotor will be self-maintaining in operation and the starting means may be disconnected;

the load if connected being immediately picked up as the succession of cycles in the rotor will be at maximum speed.

Attention is particularly called to the pump arrangement, wherein the pistons 17 move radially outwards on their working strokes; whereby injection of the liquid of compression is aided by centrifugal force, this force varying with the absolute speed of the rotor.

It is conceivable that the rotor speed be so great that centrifugal forces upon the liquid exceed those provided for by the pistons. These forces might be sufficient to alone provide compression pressures, in which case the pistons would become useless, and could be omitted except for starting. Or the forces might be sufficient only to provide acceleration at the beginning of liquid injection, leaving each piston to act at the latter end of its injection stroke, to force the last of the liquid into its combustion chamber pocket against the rising pressure therein.

Attention is also called to the location of liquid inlet to the combustion chamber pockets at points removed from the principal axis of the parts, whereby compression will progress radially inwards toward the inner extremities of the pockets to trap the compressed charge therein.

What I claim is:

1. In a motor of the class described, a rotor having a plurality of radially disposed pump cylinders with combustion chamber pockets between said cylinders, pump pistons for said cylinders, discharge nozzle openings from said pockets, and means providing for combustion in said pockets and including means providing for compression therein by liquid displacement effected by said pump means.

2. In a motor of the class described, a rotor having a central liquid-receiving cavity with a plurality of radially disposed pump cylinders leading therefrom, with combustion chamber pockets between said cylinders, each cylinder having a valved piston and a connection with one of its adjacent pockets and removed from said cavity, and each pocket having an outlet at the periphery of the rotor, and for each pocket valve means controlling its said connection and outlet.

3. In a motor of the class described, a rotor having a hollow, means providing for discharge from said hollow under combustion pressures and including means for effecting compression pressures in said hollow by liquid displacement, and a runner arranged to be actuated by said discharge, and means for recirculating liquid in said motor and comprising a collector trough arranged about said runner to receive liquid outflowing therefrom, means for driving said trough whereby said liquid will be retained therein, and means providing drainage from said trough and into said rotor.

4. In a motor of the class described, a rotor having a plurality of radially disposed pump cylinders, valved pistons for said cylinders and a crank for driving said pistons, said rotor having a combustion chamber pocket, one for each pump unit, valve means whereby an internal combustion cycle may be effected in said pockets, including compression by liquid displacement therein, and means for supplying liquid to the space central of said pistons.

In testimony whereof I hereby affix my signature.

FRANK R. HIGLEY.